United States Patent
Washko, Jr. et al.

(10) Patent No.: US 9,328,011 B2
(45) Date of Patent: May 3, 2016

(54) LASER-SCRIBING OF CHEMICALLY STRENGTHENED GLASS

(71) Applicant: Coherent, Inc., Santa Clara, CA (US)

(72) Inventors: John F. Washko, Jr., Canton, CT (US); Xinghua Li, Horseheads, NY (US); Walter R. Bosenberg, Simsbury, CT (US)

(73) Assignee: Coherent, Inc., Santa Clara, CA (US)

( * ) Notice: Subject to any disclaimer, the term of this patent is extended or adjusted under 35 U.S.C. 154(b) by 173 days.

(21) Appl. No.: 13/910,030

(22) Filed: Jun. 4, 2013

(65) Prior Publication Data

US 2014/0352358 A1    Dec. 4, 2014

(51) Int. Cl.
| | |
|---|---|
| *C03B 33/09* | (2006.01) |
| *B23K 26/142* | (2014.01) |
| *C03B 33/04* | (2006.01) |
| *B23K 26/073* | (2006.01) |
| *B23K 26/12* | (2014.01) |
| *B23K 26/14* | (2014.01) |

(52) U.S. Cl.
CPC .......... *C03B 33/091* (2013.01); *B23K 26/0736* (2013.01); *B23K 26/128* (2013.01); *B23K 26/142* (2015.10); *B23K 26/147* (2013.01); *C03B 33/04* (2013.01)

(58) Field of Classification Search
CPC .. C03B 33/02; C03B 33/0222; C03B 33/023; C03B 33/0235; C03B 33/03; C03B 33/033; C03B 33/037; C03B 33/09; C03B 33/091; C03B 33/093; C03B 33/00
See application file for complete search history.

(56) References Cited

U.S. PATENT DOCUMENTS

| | | | | |
|---|---|---|---|---|
| 3,597,578 | A * | 8/1971 | Sullivan et al. | 219/121.67 |
| 4,403,134 | A * | 9/1983 | Klingel | 219/121.67 |
| 4,760,583 | A * | 7/1988 | Sasnett et al. | 372/109 |
| 6,156,049 | A * | 12/2000 | Lovato et al. | 606/170 |
| 6,576,869 | B1 | 6/2003 | Gower et al. | |
| 2007/0084839 | A1* | 4/2007 | Zhang et al. | 219/121.84 |
| 2009/0032505 | A1* | 2/2009 | Huang et al. | 219/121.67 |
| 2010/0206008 | A1* | 8/2010 | Harvey et al. | 65/105 |
| 2010/0210442 | A1* | 8/2010 | Abramov et al. | 501/66 |
| 2010/0291353 | A1* | 11/2010 | Dejneka et al. | 428/192 |
| 2011/0049765 | A1* | 3/2011 | Li et al. | 264/400 |
| 2011/0127242 | A1* | 6/2011 | Li | 219/121.69 |
| 2011/0226832 | A1* | 9/2011 | Bayne et al. | 225/2 |

(Continued)

FOREIGN PATENT DOCUMENTS

WO    WO 2013031778 A1 *   3/2013

OTHER PUBLICATIONS

Sysoev et al., "Using of Middle IR Lasers for Guided Termocleavage of Glass", Fundamentals of Laser Assisted Micro- and Nanotechnologies, Proc. of SPIE, vol. 6985, 2008, pp. 69850O-1-69850O-11.

*Primary Examiner* — Jodi C Franklin
(74) *Attorney, Agent, or Firm* — Morrison & Foerster LLP

(57) ABSTRACT

A method is disclosed for scribing a contained crack or vent in a chemically strengthened glass sheet. The glass has shallow surface regions under compressive stress, bounding a central region under tensile stress. The vent is formed by rapidly bulk-heating the glass, using radiation from a carbon monoxide laser, to a depth just below a surface compressive region and extending marginally into the tensile stress region then rapidly cooling the heated region with a water mist spray. The glass sheet can be subsequently divided along the vent by application of mechanical or thermal stress.

21 Claims, 4 Drawing Sheets

(56) References Cited

U.S. PATENT DOCUMENTS

| | | | |
|---|---|---|---|
| 2011/0248005 A1* | 10/2011 | Briand et al. | 219/121.72 |
| 2012/0047956 A1* | 3/2012 | Li | 65/112 |
| 2012/0145331 A1* | 6/2012 | Gomez et al. | 156/712 |
| 2013/0221053 A1* | 8/2013 | Zhang | 225/2 |
| 2013/0224433 A1* | 8/2013 | Matsumoto et al. | 428/131 |
| 2013/0224439 A1* | 8/2013 | Zhang et al. | 428/157 |
| 2013/0236666 A1* | 9/2013 | Bookbinder et al. | 428/34.4 |
| 2013/0291598 A1* | 11/2013 | Saito et al. | 65/112 |
| 2013/0323469 A1* | 12/2013 | Abramov et al. | 428/155 |
| 2014/0083986 A1* | 3/2014 | Zhang et al. | 219/121.69 |
| 2014/0093693 A1* | 4/2014 | Zhang et al. | 428/157 |
| 2014/0102146 A1* | 4/2014 | Saito et al. | 65/112 |
| 2014/0165652 A1* | 6/2014 | Saito | 65/28 |
| 2014/0174131 A1* | 6/2014 | Saito et al. | 65/112 |
| 2014/0340730 A1* | 11/2014 | Bergh et al. | 359/275 |
| 2014/0352358 A1* | 12/2014 | Washko et al. | 65/112 |

\* cited by examiner

LASER-SCRIBING OF CHEMICALLY STRENGTHENED GLASS

TECHNICAL FIELD OF THE INVENTION

The present invention relates in general to laser-cutting of glass and other brittle materials. The invention relates in particular to laser-scribing of chemically strengthened glass.

DISCUSSION OF BACKGROUND ART

Radiation from a laser has been used, and still is being used, for cutting various materials including dielectric materials in general. Laser cutting is now increasingly used as a replacement for mechanical cutting of large sheets of glass into smaller shapes for various applications.

Several techniques have been developed over the past several years using various types of laser alone or in combination, i.e., with two or more lasers required for a particular process. The laser types used include long-wavelength infrared IR lasers, particularly carbon-dioxide ($CO_2$) gas-discharge lasers, near IR (NIR) solid-state pulsed lasers, and pulsed, solid-state lasers with wavelengths in the visible and near ultraviolet (UV) region of the spectrum. This latter type typically involves NIR pulsed lasers with frequency conversion using optically nonlinear crystals.

The choice of a laser (or lasers) for the glass-cutting depends, inter alia, on the glass type and thickness of glass being cut, the cutting speed required, and the quality desired of a cut edge. Cost of the laser cutting equipment can also be a factor in deciding which type of laser and process to select.

In recent years there has been developed a type of glass generally categorized as chemically strengthened glass. This type of glass is in increasing demand for covering display screens on hand-held electronic devices such as "smart phones" and tablet computers.

The chemical strengthening is achieved by an ion-exchange process in which a sheet of conventional glass is immersed in a solution containing potassium (K) salts in a manner which causes potassium ions to replace sodium ions in outer surface regions of the glass. This places the outer surface regions of the sheet in compression, with an inside (center) region in tension. By way of example in a sheet of glass having a total thickness of about 0.5 millimeters (mm), the compressive surface regions have a depth of about 21 micrometers ($\mu m$). The surface-compression regions make the chemically strengthened glass particularly resistant to cracking or breakage due to mechanical stresses or impact. The compressive and tensile stresses are in a stable balance which provides the stress and impact resistance properties.

The compression-tension stresses also make this glass difficult to cut as most processes developed for conventional glass can upset the stable balance between the compressive and tensile stresses to some degree creating unwanted cracking or breakage and generally resulting in an unacceptably low cutting-yield. A most common approach to avoiding the problem of cutting the chemically strengthened glass is to cut desired shapes from glass prior to strengthening and then immerse the cut parts in the solution for strengthening individual parts. This however requires means for handling a high volume of individual parts during the strengthening process.

There is a need for a laser cutting method for chemically strengthened sheet-glass wherein the laser-radiation interaction with the chemically strengthened glass can be controlled in a manner which preserves the stable balance between the outer compressive stress and the inner tensile stress. The method should be applicable to cutting relatively large sheets of the chemically strengthened glass.

SUMMARY OF THE INVENTION

The present invention is directed to a method and apparatus scribing a sheet of chemically strengthened glass for subsequent separation into one or more parts. The chemically strengthened glass sheet is characterized as having opposite surface zones under compressive stress, with a central zone between the surface zones being under tensile stress. In one aspect of the invention, the scribing method comprises directing a beam of laser-radiation from a carbon monoxide (CO) laser onto a surface to be scribed, and while translating the laser-radiation beam with respect to a surface of the chemically strengthened glass sheet, heating the glass sheet to a depth extending below the surface zone, and extending partially into the central zone. A coolant spray is directed onto the surface at a predetermined distance behind the laser-radiation beam in the translation-direction of the beam. This cools the heated surface-zone and creates a contained crack following the translation-direction of the laser-radiation beam. The crack has a depth extending below the surface zone and partially into the central zone.

In one preferred embodiment of apparatus for carrying out the inventive scribing method, an inventive feature is provided for converting a Gaussian intensity distribution of the beam from the laser into a flat-top "(top-hat" or uniform) intensity distribution on the glass sheet. In another embodiment of apparatus for carrying out the inventive scribing method, an inventive device provides that the coolant spray is an annular spray surrounding the laser beam.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
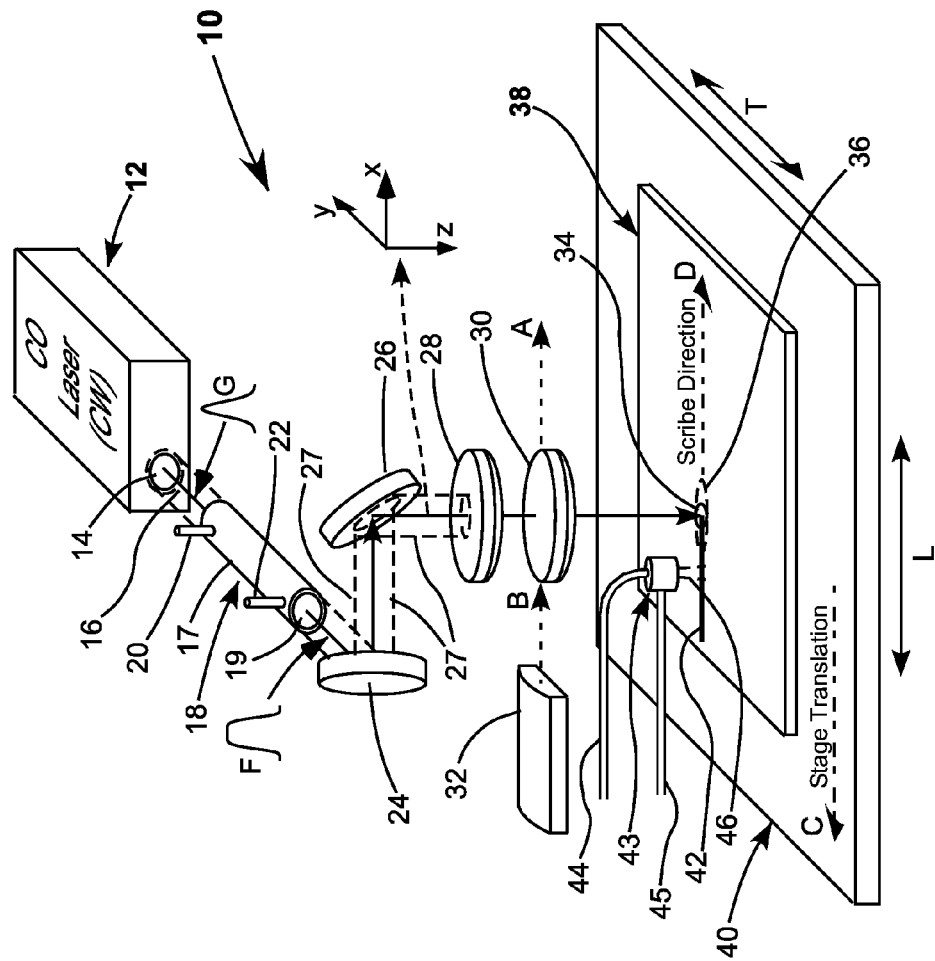
FIG. 1 is a three-dimensional view schematically illustrating a preferred embodiment of apparatus in accordance with the present invention for laser scribing grooves or vents in a sheet of chemically strengthened glass prior to separating the sheet into individual parts defined by the vents, the apparatus including a CO laser delivering a beam of radiation, optics for focusing the beam on a sheet of glass being scribed, a water spray atomizer for cooling the sheet in the vicinity of the focused laser beam, and a translation stage for translating the sheet relative to the focused beam and the water spray for forming one of the vents.

Referring now to the drawings, wherein like components are designated by like reference numerals, FIG. 1 schematically illustrates a preferred embodiment 10 of apparatus in accordance with the present invention for laser scribing grooves or vents in a sheet of chemically strengthened glass prior to separating the sheet into individual parts defined by the vents. The apparatus includes a carbon monoxide (CO) laser 12 preferably operating in a continuous wave (CW) mode. Such a laser is commercially available from Coherent Inc. of Santa Clara, Calif., an assignee of the present invention. This laser is energized (driven) by radio frequency (RF) power. The term "CW" as used herein for the CO laser includes what might be designated quasi-CW operation resulting from the RF-driving, wherein the laser radiation is modulated at the frequency of the RF radiation. This frequency is typically about 100 megahertz (MHz).

Laser radiation is delivered as a beam 16 via a window 14 in the laser. Beam 16 can include CO characteristic laser-wavelengths in a range between about 4 micrometers (μm) and about 6 μm. Beam 16, on exiting window 14, has an about round cross-section, and an about Gaussian intensity-distribution (indicated in the drawing by curve G). A more preferred cross-section for the beam has a more uniform intensity-distribution commonly referred as a "flat top" or "top-hat" intensity-distribution.

A flat-top intensity distribution in apparatus (indicated in FIG. 1 by curve F) is provided by a simple inventive arrangement 18, comprising a controlled-atmosphere tube 17 having windows 19 sealed to the tube at each end. Air having a controlled relative humidity is flowed through tube 17 via an inlet 20 and an outlet 22. Passage through the humid air in the tube is sufficient to change the Gaussian energy distribution G of the beam entering the tube to the flat-top distribution F of the beam exiting the tube.

By way of example, in one example of arrangement 18, tube 17 has a length of about 25 centimeters (cm) and a diameter of about 5 cm. An input beam had a $1/e^2$ diameter of about 6 mm and a power of about 90W. Air having a relative humidity of about 35% was flowed through the tube at a rate of about 20 liters per minute (LPM). This was sufficient to provide the desired flat-top distribution. Clearly, several variables, such as tube-length, air-flow rate, and relative humidity are available to accommodate beams having different parameters. Further, a carrier gas other than air may be used while still staying within the bounds of the inventive intensity-distribution transformation arrangement.

Regarding humidifying the air, this may be accomplished by any well-known means such as passing dry-air through a water bath. Relative humidity could be controlled by varying the air-flow rate through the water bath or the temperature of the water in the bath. As such humidifying means are well-known, a detailed description or depiction thereof is not presented herein.

It is not clear what mechanism is responsible for causing the transformation of intensity-distribution. As there are a number of hydroxyl-radical ($OH^-$) absorption bands within the wavelength range of emission of a CO laser, one possible explanation, without being limited to a particular hypothesis, is that the transformation is due to an absorption induced thermal-lensing effect. Whatever the mechanism, it is important that the humidified air is flowing, at least for maintaining the effective relative-humidity level, and also for carrying away any heating of the gas resulting from the absorption. It should also be noted that the mechanism is not due to any wave-guiding action of tube 17, as the dimensions of the tube are selected such that only free-space propagation of the beam can occur.

In order for this beam transformation to be effective, and indeed for minimizing ambient atmospheric absorption or uncontrolled transformation of the laser-beam, it is most preferable that the remainder of the beam-path from the laser to the focusing lenses is enclosed, by one or a plurality of enclosures, indicated by long-dashed lines 27 for simplicity of illustration, and that the enclosure or enclosures are purged with a dried flowing gas, such as dry nitrogen.

Continuing with reference to FIG. 1, beam 16 having the flat-topped intensity-distribution is steered by plane-mirrors 24 and 26 to a beam focusing lens comprising spherical positive lens elements 28 and 30. These elements focus beam 16 into a round focal-spot 34 on a sheet 38 of chemically-strengthened glass being scribed. Glass-sheet 38 is supported on a translation stage 40. Translating stage 40 in the direction indicated by arrow C causes focal-spot 34 to scan over sheet 38 linearly in the direction indicated by arrow D. The focal-spot may be more generally referred to as the beam-spot. This is because in certain operations, described in detail further hereinbelow, the beam may be focused slightly above the surface of the sheet to create a beam-spot on the sheet having dimensions bigger than the actual (or theoretical) focal-spot.

Provision for longitudinal and transverse reciprocal motion of stage 40, indicated by arrow L and T respectively, can provide for scribing curved vents. Scribing curved vents has particular requirements which are described in detail further hereinbelow.

An atomizer 43 is fed by water-flow through a conduit 44, and by air-flow through a conduit 45. The atomizer sprays a water-mist 46 on the vent at some predetermined distance, for example about 2 mm, from the focal-spot. The cooling spray effectively "follows" the focal-spot over the sheet. The CO laser-radiation at the focal spot is absorbed in the bulk of glass and locally heats the glass to a depth determined by the beam and focal spot parameters. Near-immediate cooling by the water-mist spray rapidly cools the heated glass and causes a controlled crack or vent 42. The vent is actually initiated at a purposely-created defect (not shown) in the glass surface. The scale of the drawing does not permit accurate representation of the created defect. A more detailed description of the defect creation and vent-formation process is provided further hereinbelow.

Regarding focal-spot dimensions, while apparatus 10 is described with reference to a round focal-spot, it may be found preferable in some applications, for example for making an extended straight vent, to have a focal-spot extended in one direction. With this in mind, in apparatus 10, spherical lens 30 is replaceable by a cylindrical (optical power in one transverse axis only) lens 32. Here the power is in a direction at 90° to the vent direction. Lens 30 is moved out of the beam as indicated by arrow A. Lens 32 is moved into the beam as indicated by arrow B.

In this example, cylindrical lens 32 has positive power only in the y-axis, which is the vent-width direction, as depicted. If the y-axis power of lens 32 is the same as the power of lens 30 an elongated (elliptical) focal-spot 36 (depicted in phantom) will result. Focal-spot 36 will have the same width (y-axis dimension) as focal-spot 34, but will have a longer x-axis dimension due to the reduced optical power of the combination of lens elements 28 and 32.

It will be evident to those skilled in the optical art, without further detailed description or illustration, that lens 32 could have a y-axis power different from that of lens 30. Further, lens 28 may be made replaceable by another lens to provide for a wider variation of focal-spot dimensions. A particularly elongated focal spot can be generated by replacing both spherical lenses with a single cylindrical lens having twice the y-axis power or two cylindrical lenses having the same Y-axis power as the two spherical lenses. These and any other variations of focusing optics with adjustable focal-spot shape may be practiced without departing from the spirit and scope of the present invention. Regarding means for replacing the elements, this could be accomplished by a simple translation-stage, or stages, not shown in FIG. 1 for simplicity of illustration.

Figure 1A:
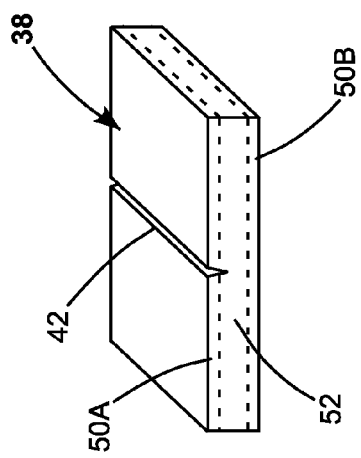
FIG. 1A is a three-dimensional view schematically illustrating one form of a vent formed by the apparatus of FIG. 1 in the chemically strengthened glass sheet, relative to compressive-stress and tensile-stress zones of the sheet.
Figure 1B:
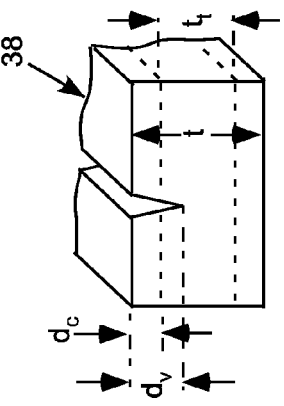
FIG. 1B is a three-dimensional view schematically further detail of the vent depicted in FIG. 1A.

The depth of vent 42 relative to the surface compressive zone of the chemically strengthened glass is very important. This is illustrated schematically in FIG. 1A and FIG. 1B. In FIG. 1A, the upper and lower surface compressive regions are designated 50A and 50B respectively. Region 52 is the central tensile region between the compressive regions. In FIG. 1B the thickness of sheet 38 is designated t; the depth of the compressive regions is designated $d_c$; the thickness of the central tensile region is designated $t_t$ and the depth of vent 42 is designated $d_v$. The depth can be conveniently controlled by controlling beam power focal-spot size, intensity distribution; the speed which the focal-spot is scanned over the chemically strengthened glass sheet; and the distance of the water-mist spray from the focal-spot.

In empirical terms, the vent must have a depth ($d_v$) sufficient to extend through compressive region 50A into tensile region 52, but not so far into the tensile region that instability of the stress balance causes a self-propagating crack to develop. With vents of the correct depth, a sheet, such as sheet 38, can be scribed with a plurality of vents 42 to define a plurality of parts of a desired shape. The parts can then be separated by applying mechanic force to the vents, or introducing local thermal stress in the vents through heating the surface with a surface-absorbed laser beam, such as a $CO_2$ laser beam having a wavelength of about 10.6 μm.

Figure 2:
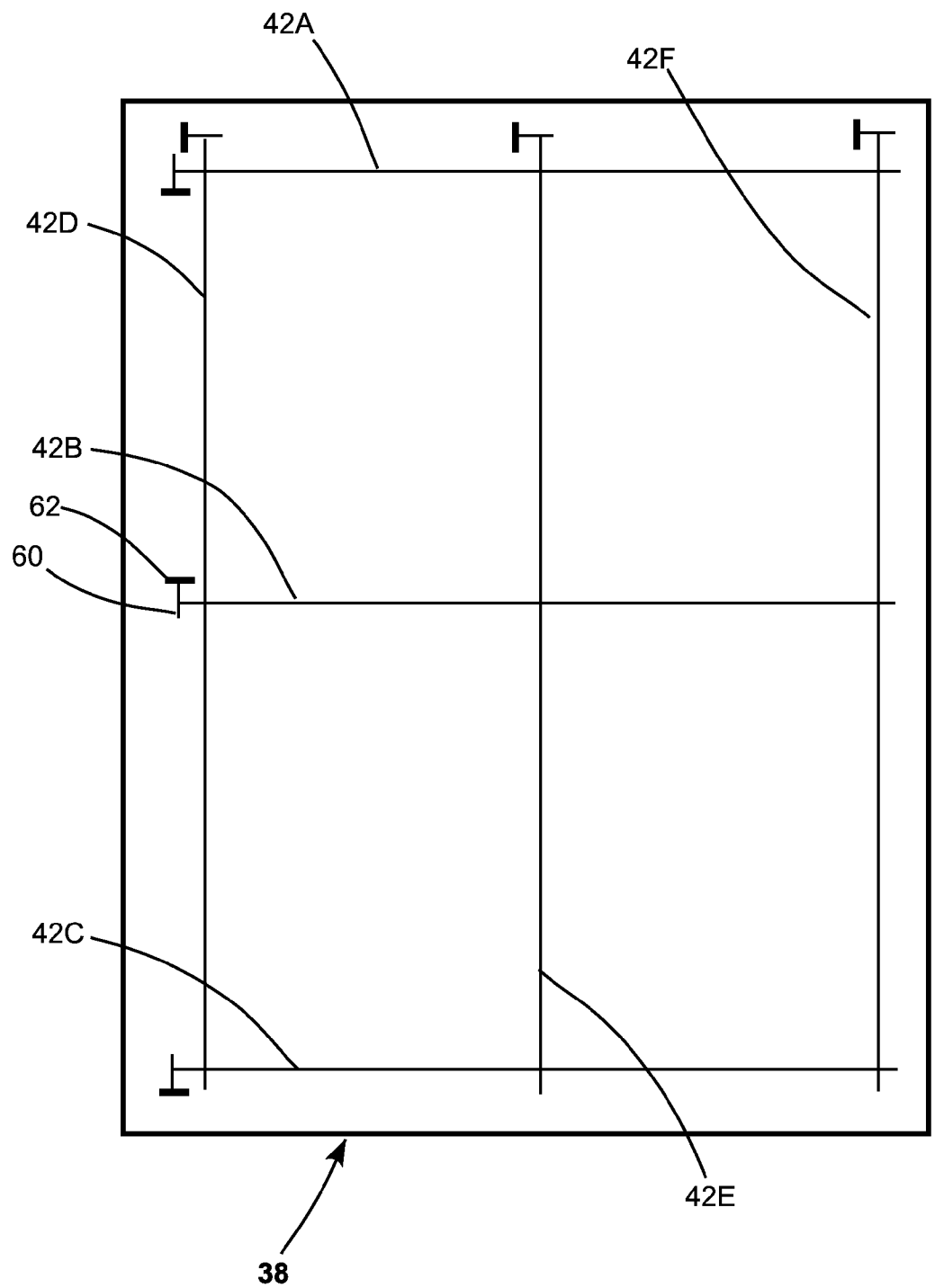
FIG. 2 schematically illustrates scribing a glass sheet in accordance with the present invention using six vents to define four panels for subsequent separation, with each vent initiated at a corresponding purposefully created defect in the sheet.

In absolute terms, by way of example, in a sheet of chemically strengthened CT-30 glass (available from Corning Inc, of Corning, N.Y.) having a thickness of about 0.55 mm compressive regions 50A and 50B have depth $d_c$ of about 21 μm. The vent-depth dv should preferably be greater than 80 μm but preferably not greater than about 110 μm. A detailed description of scribing a CT-30 glass sheet for separating the sheet into multiple parts is set forth below with reference to FIG. 2.

Here, a sheet 38 of CT-30 glass is scribed for later separation into four panels by vents 42A, 42B, 42C, 42D, 42E, and 42F. All of the vents are formed by the same process. Accordingly the description of the process is provided only for one of the vents, arbitrarily selected as vent 42B.

The first stage of the process is creating a line-defect (linear defect) 60 from which the vent is initiated. Line defect 60 is preferably formed in a direction transverse (perpendicular) to the direction in which the vent will be formed. In theory such a defect could be created by a diamond scribe or the like but the highly compressively stressed surface region of the chemically strengthened glass makes for relatively poor control of the defect depth and a propensity for self-propagating surface cracking. In this preferred method, the defect itself is laser-propagated from a directly-laser-damaged area 62.

The direct damage is formed by focusing the laser into a round spot quenched by the water-mist as described above. Beam parameters are selected such that that the damage is in the form of surface and sub-surface cracking, which is self-contained, i.e., not self-propagating.

In one example of creating the direct-damage region, the laser beam, with a nominal wavelength of 5 μm had the flat-top intensity distribution discussed above, a diameter of about 12 mm as measured by burning a hole in a burn-card, and was focused on the surface of the sheet in a round spot having a diameter of 100 microns. The beam power was 80 Watts (W). The water-mist from the atomizer was directed at a distance about 2 mm behind the round beam, with water-flow of 3 milliliters per minute (mL/min), and air-flow of 1.2 liters per minute (L/min). The water temperature was about 15° C. The scan speed of the laser beam (and water-mist spray) was about 250 mm per second (mm/sec). The length of the direct-damage region was about 6 mm.

Line defect 60 was created by propagating laser damage from the direct damage region 62 by scanning the laser beam and water-mist. The propagated damage is created by a similar process to the vent creation, i.e, by thermal-shock conditions resulting from the bulk laser-heating followed by the water-mist cooling. As in the vent formation, it is desirable that the depth of the propagated damage created does not extend into the central tensile region of the glass sufficient to cause one or more self-propagating cracks.

In one example of creating defect 60 by propagating damage from direct damage region 62, the laser beam, again with a nominal wavelength of 5 μm, had the flat-top intensity distribution discussed above. A cylindrical lens was arranged to focus the beam at a height of about 2 mm above the glass sheet with an elongated spot on the sheet having a width of about 0.4 mm and a length of about 12 mm as measured by the burn-card. The beam power was 80 Watts (W). The water-mist from the atomizer was directed at a distance about 2 mm behind the elongated beam, and the water-mist parameters were as described above. The scan-speed of the laser beam (and water-mist spray) was about 200 mm per second (mm/sec). The length of defect 60 was about 20 mm. The length of the beam spot was in the scan direction In one example of creating vent 42B from defect 60, the 5 μm-wavelength laser beam had the flat-top intensity distribution discussed above. The cylindrical lens was arranged to focus the beam at a height of about 5 mm above the glass sheet creating a beam with an elongated spot on the sheet having a width of about 0.8 mm and a length of about 12 mm, as measured by the burn-card. The beam power and water-mist parameters were as described above. The vent-scan was initiated with the beam behind the defect. The scan-speed of the laser beam (and water-mist spray) was about 180 mm per second (mm/sec), with the length of the elongated beam-spot in the scan direction. In most cases, the depth of the vent (contained crack) is about the same as the depth of the defect. A particular benefit of the inventive vent-formation (contained-crack formation) method is that it permits one vent to cross an existing vent without introducing any damage at the crossing point.

It cannot be overemphasized how important the use of the high power CO laser having wavelengths in the region between about 4 micrometers (μm) and about 6 μm is to the inventive chemically strengthened glass scribing method. Applicants were motivated to develop the inventive method after many unsuccessful attempts to scribe or cut the chemically strengthened glass with 10.6 μm-wavelength $CO_2$ laser radiation. Absorption of glass for 10.6 μm-wavelength radiation is extremely high, so that there is essentially no penetration into the bulk that would create the vent formation method of the present invention. The glass absorption coefficients in the wavelength region between about 4 micrometers (μm) and about 6 μm allow for heating the glass, in bulk, to the controlled depth needed to extend below the surface compression region with minimal penetration into the central region, thereby maintaining the glass in a stable state. At the shorter (1 μm and less) wavelengths of solid-state lasers, glass absorption is almost zero. Even with sufficient power to cause heating, this heating would occur throughout the glass thickness and could not be effected at the controlled depth required of the inventive method.

In the example provided above, an elongated beam is used for generating vents 42A-F. While the elongated beam is convenient for forming straight vents, it is not practical for forming a curved vent, as would be necessary for scribing a rounded rectangle shape. This is because alignment of the elongated beam and the wafer would mean that the beam was only in tangential contact with an arc to be scribed, and the beam and the water spray could not both be constantly on the arc.

At least one popular smart-phone brand has a cover glass in rounded rectangular form, so there is a motivation to adapt the inventive vent-scribing process to scribing arcs. This is facilitated by the fact that a round beam can be used to form a vent avoiding the tangential problem of the elongated beam. It is then only necessary to provide that the round beam and the water spray are always on the arc.

Figure 3:
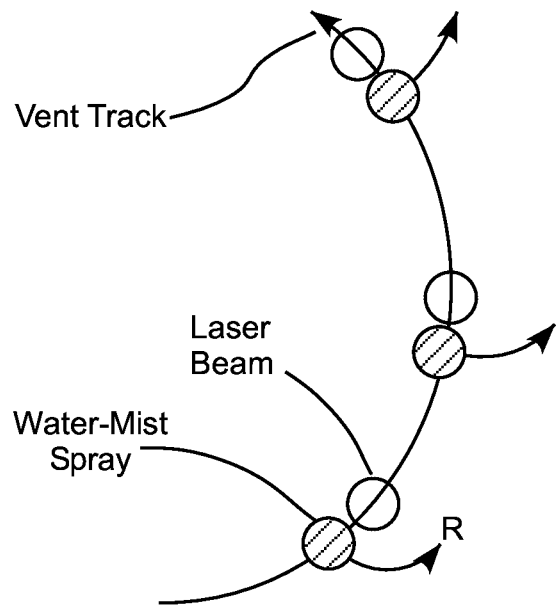
FIG. 3 schematically illustrates coordinating movement of a round laser beam and the spray-cooling atomizer of FIG. 1 for forming an arc-shaped vent.

One way of coordinating a round beam with the water spray for arc-scribing is depicted very schematically in FIG. 3. Here, an arrowhead tipped arcuate path depicts a vent-shape to be produced. An open circle represents a laser beam at various points on the arc. This could be effected by two-axis (x-y) movement of translation stage 40 in the apparatus of FIG. 1. The water-mist spray is depicted by a shaded circle. As the laser beam proceeds around the arcuate path, the water spray (the atomizer of FIG. 1) is rotated around the laser beam, as indicated by arrow R, so that both the laser-beam and the water-mist spray remain on the arcuate path for forming a corresponding arcuate vent. While this method is certainly effective, a requirement for providing independent but coordinated motion of the atomizer relative to the translation stage adds considerable complexity to the apparatus of FIG. 1 by. This complexity would increase if the apparatus were required to scribe arcuate-shaped vents of different curvature or even arbitrarily curved vents.

Figure 4:
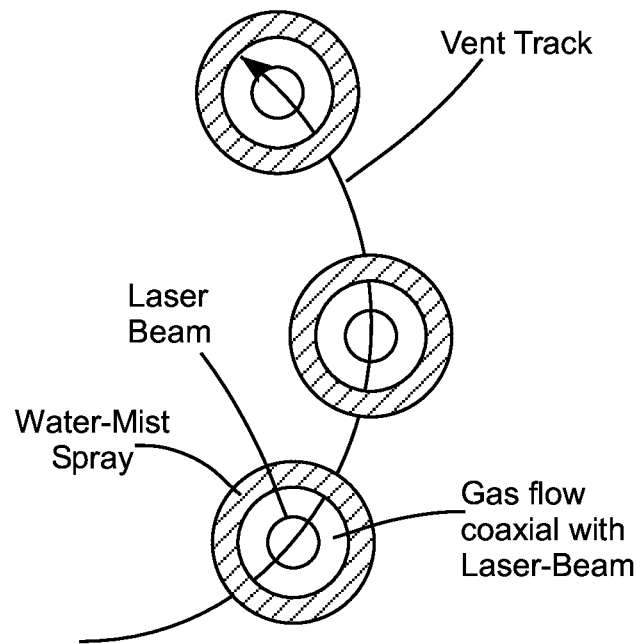
FIG. 4 schematically illustrates forming an arc-shaped vent using a round laser beam surrounded by an annular water-spray.
Figure 5:
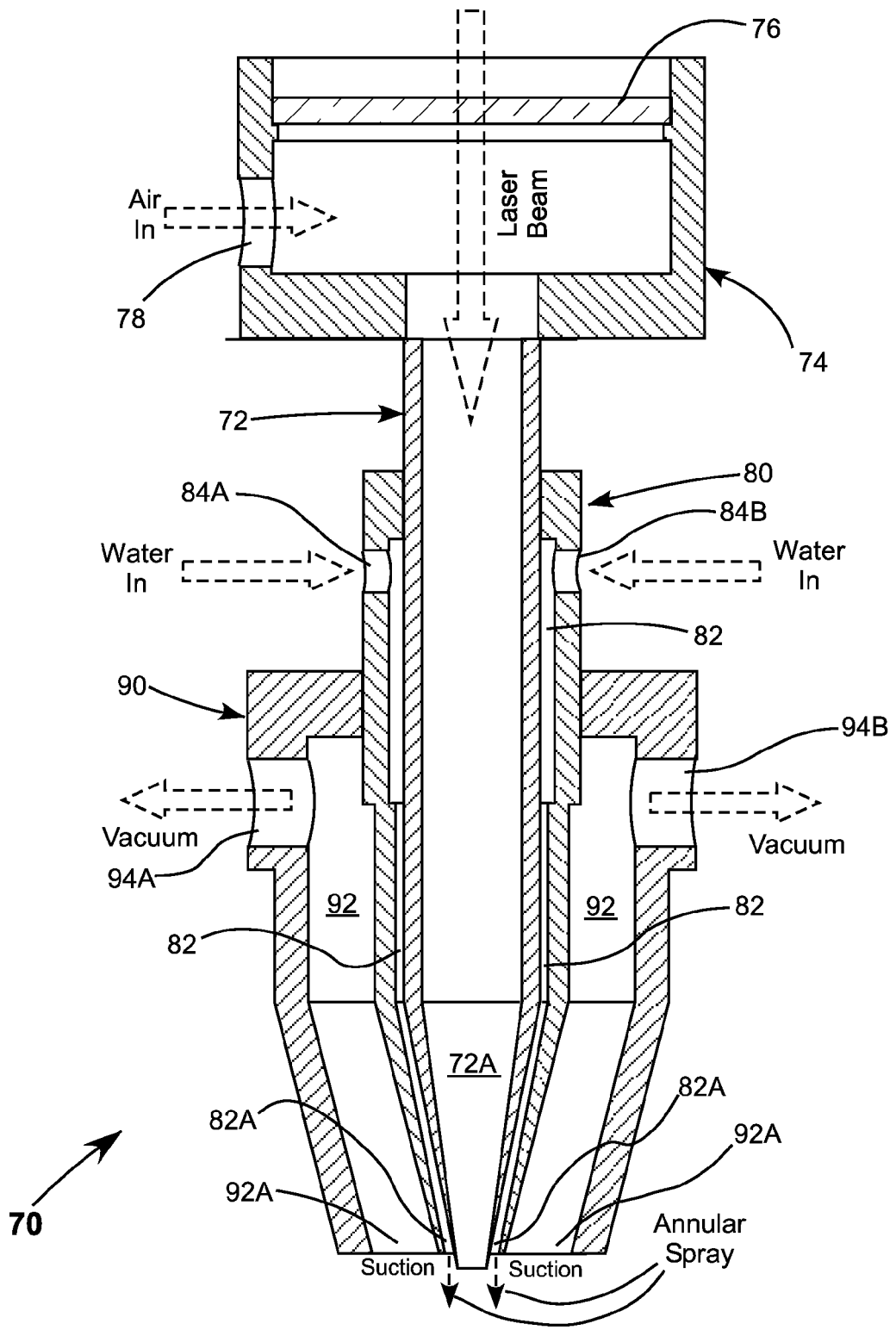
FIG. 5 is a cross-section view schematically illustrating an atomizer in accordance with the present invention for forming the annular water spray of FIG. 3.

An alternative method to providing arcuate shaped vents is schematically depicted in FIG. 4. Here the water-mist spray has an annular shape (shaded annulus) disposed, preferably concentrically, around the laser beam (open circle) in a fixed spatial relationship thereto. A gas, such as nitrogen flowing coaxially around the laser beam and exiting through the same orifice as the beam provides positive pressure and prevents the water mist from impinging onto the glass in the region of laser heating. A minor drawback of this method is that water mist is deposited ahead of the laser beam and the arcuate path. However, as this is deposited on not-yet-heated glass, no thermal shock results, and the deposited water is kept from interacting with the laser beam by the coaxial gas-pressure. A significant advantage is that this method can be implemented in the apparatus of FIG. 1 merely by changing the conventional atomizer by a specially configured atomizer. A detailed description of one such atomizer is set forth below with reference to FIG. 5.

Here an atomizer 70 in accordance with the present invention includes a central conduit 72 for air-flow and beam-transmission. Conduit 72 is in fluid communication with an air plenum chamber 74, which is enclosed at one end thereof by a window 76, transparent to the CO laser-radiation wavelengths. The laser beam is introduced into the atomizer through this window as indicated in the drawing. Air is supplied to the plenum chamber via an aperture 78 therein. Conduit 72 has a tapered region 72A at the distal end thereof to force air-flow through the conduit into a jet.

Surrounding central conduit 72 is a water-sleeve 80. Sleeve 80 is sealed to conduit 72 near the proximal (input) end thereof and is open at the distal end. Sleeve 80 is configured such that a cylindrical conduit is formed around the central conduit leaving an annular aperture 82A at the open end of the cylindrical conduit. The sleeve is tapered corresponding to the taper of the central conduit such that the cylindrical conduit is also correspondingly tapered. Water is input into the cylindrical conduit through input apertures 84A and 84B of sleeve 80 and exits the cylindrical conduit via aperture 82A thereof. The juxtaposition of the water from aperture 82A with the airflow from end 72A of the central conduit creates the annular water mist spray of FIG. 4.

Surrounding water sleeve 80 is a vacuum sleeve 90. Vacuum sleeve 90 is sealed to water sleeve 80 at a proximal end thereof and open at a distal end thereof.

Sleeve 90 is tapered in conformance with the tapering of central conduit 72 and water-sleeve 80 and forms a correspondingly tapered vacuum conduit 92 surrounding water sleeve 80.

Conduit 92 has an annular opening 92A surrounding annular water outlet 82A of sleeve 80. A vacuum pump (exhaust pump) communicates with conduit 92 via apertures 94A and 94B in vacuum sleeve 90. This provides for a vacuum or suction effect in an annular region surrounding the annular water-mist spray. One function of this vacuum or suction effect is to inhibit the incursion of the water mist spray into the region of the beam, reinforced by the air jet from the central conduit. Another function is to remove any steam resulting from the interaction of the laser beam with pre-sprayed regions (by the annular spray) of a sheet being scribed.

The present invention is described above in terms of a preferred and other embodiments. The invention is not limited, however, to the embodiments described and depicted. Rather the invention is limited only by the claims appended hereto.

What is claimed is:

1. A method of scribing a sheet of chemically strengthened glass for subsequent separation into one or more parts, the chemically strengthened glass sheet characterized as having opposite surface zones under compressive stress, with a central zone between the surface zones being under tensile stress, the method comprising:

using a beam of laser-radiation from a carbon monoxide (CO) gas laser directed onto a surface to be scribed, and while translating the laser-radiation beam with respect to a surface of the chemically strengthened glass sheet, heating the glass sheet to a depth extending below the surface zone, and extending partially into the central zone; and directing a coolant spray onto the surface at a predetermined distance behind the laser-radiation beam in the translation-direction thereof, thereby cooling the heated surface-zone and creating a contained crack following the translation-direction of the laser-radiation beam, the crack having a depth extending below the surface zone partially into the central zone;

and wherein the beam of laser radiation emitted from the laser has an about Gaussian intensity distribution and wherein the beam is transmitted through a sealed enclosure containing air having a predetermined controlled humidity selected to convert the Gaussian intensity distribution to a flat-top intensity distribution, wherein the beam having a flat-top intensity distribution is directed to the surface to be scribed.

2. The method of claim 1, wherein laser-radiation beam is directed by a lens selected to provide a beam-spot of a predetermined shape on the surface to be scribed.

3. The method of claim 2, wherein the translation-direction is in a straight line and the beam-spot has an elongated shape having a length aligned with the translation-direction.

4. The method of claim 2, wherein the translation-direction is along an arcuate path and the beam-spot has a round shape.

5. The method of claim 4, wherein the coolant spray is an annular spray surrounding the laser-radiation beam and leaving an air gap between the spray and the beam.

6. The method of claim 5, wherein gas is forced between the annular coolant spray and the laser-radiation beam for preventing incursion of the coolant spray into the laser beam.

7. The method of claim 2, wherein the lens focuses the beam on the surface.

8. The method of claim 2, wherein the lens focuses the beam above the surface.

9. The method of claim 1, wherein the beam path outside the controlled-humidity enclosure is purged with dry nitrogen.

10. The method of claim 1, further including the steps forming a linear defect in the defect extending in a direction transverse to the translation-direction of the laser-radiation beam, and initiating the translation of the laser-radiation beam at a point behind the linear defect in the translation-direction for forming the contained surface crack.

11. The method of claim 10, wherein the linear defect has a depth extending through the surface compressive-stress zone of the chemically strengthened glass sheet and partially into the central tensile-stress zone of the chemically strengthened glass sheet.

12. The method of claim 11, wherein the contained crack formed by the translation of the heating the glass sheet and directing of coolant spray onto the surface has a depth about equal to the depth of the linear defect.

13. The method of claim 12, wherein the linear defect is formed by the steps of, creating a contained region of surface laser damage using the directed laser-radiation beam, and propagating the linear defect from the controlled damage region by heating the surface-zone using the laser-radiation beam, then subsequently cooling the heated surface zone using the coolant spray, while translating the laser-radiation beam and the coolant spray in a direction transverse to the translation-direction used for forming the contained surface crack.

14. The method of claim 1, wherein the laser-radiation beam has one or more wavelengths in a range between about 4 micrometers and about 6 micrometers.

15. A method of scribing a sheet of chemically strengthened glass for subsequent separation into one or more parts, the chemically strengthened glass sheet characterized as having opposite surface zones under compressive stress, with a central zone between the surface zones being under tensile stress, the method comprising:
creating a linear defect in a surface of the chemically strengthened glass sheet to be scribed, the linear extending in a first direction; then
using a beam of laser-radiation from a carbon monoxide (CO) gas laser directed onto the surface to be scribed, and while translating the laser-radiation beam with respect to the surface of the chemically strengthened glass sheet in a second direction transverse to the first direction along a path crossing the linear defect, heating the glass sheet to a depth extending below the surface zone, and extending partially into the central zone; and
directing a coolant spray onto the surface at a predetermined distance behind the laser-radiation beam in the translation-direction, thereby creating a contained crack following the translation-direction of the laser-radiation beam, the crack having a depth extending below the surface zone partially into the central zone and wherein the linear defect is formed by the steps of, initially creating a contained region of surface laser-damage using the directed laser-radiation beam, and propagating the linear defect from the controlled damage region by heating the surface-zone using the laser-radiation beam, then subsequently cooling the heated surface zone using the coolant spray, while translating the laser-radiation beam and the coolant spray in the first direction.

16. The method of claim 15, wherein the laser-radiation beam has one or more wavelengths in a range between about 4 micrometers and about 6 micrometers.

17. The method of claim 15, wherein laser-radiation beam is directed by a lens selected to provide a beam-spot of a predetermined shape on the surface to be scribed.

18. The method of claim 17, wherein the translation-direction is in a straight line and the beam-spot has an elongated shape having a length aligned with the translation-direction.

19. The method of claim 17, wherein the translation-direction is along an arcuate path and the beam-spot has a round shape.

20. The method of claim 15, wherein the beam of laser-radiation directed onto the surface has a flat-top intensity distribution.

21. The method of claim 20, wherein the beam of laser radiation from the laser has an about Gaussian intensity distribution and the flat-top intensity distribution of the laser-radiation beam on the surface is caused by propagating the Gaussian-intensity-distribution laser radiation beam through an enclosure of a predetermined length containing air having a predetermined controlled humidity.

\* \* \* \* \*